US008838670B2

(12) United States Patent
Poese et al.

(10) Patent No.: US 8,838,670 B2
(45) Date of Patent: Sep. 16, 2014

(54) COLLABORATION BETWEEN INTERNET SERVICE PROVIDERS AND CONTENT DISTRIBUTION SYSTEMS

(75) Inventors: Ingmar Poese, Berlin (DE); Georgios Smaragdakis, Berlin (DE); Benjamin Frank, Berlin (DE); Anja Feldmann, Berlin (DE); Steve Uhlig, Berlin (DE)

(73) Assignee: Deutsche Telekom AG, Bonn (DE)

( * ) Notice: Subject to any disclaimer, the term of this patent is extended or adjusted under 35 U.S.C. 154(b) by 406 days.

(21) Appl. No.: 13/410,450

(22) Filed: Mar. 2, 2012

(65) Prior Publication Data

US 2012/0226734 A1 Sep. 6, 2012

(30) Foreign Application Priority Data

Mar. 4, 2011 (EP) .................................... 11157047

(51) Int. Cl.
| G06F 15/16 | (2006.01) |
| G06F 15/173 | (2006.01) |
| H04L 29/12 | (2006.01) |
| H04L 29/08 | (2006.01) |

(52) U.S. Cl.
CPC ........ H04L 61/1511 (2013.01); H04L 67/1002 (2013.01); H04L 61/1541 (2013.01); *H04L 67/1021* (2013.01); *H04L 67/101* (2013.01); *H04L 67/1008* (2013.01)
USPC ........... 709/201; 709/219; 709/220; 709/223; 709/224

(58) Field of Classification Search
USPC .......................... 709/201, 219, 220, 223, 224
See application file for complete search history.

(56) References Cited

U.S. PATENT DOCUMENTS

| 2003/0009591 A1* | 1/2003 | Hayball et al. ................ 709/245 |
| 2003/0172163 A1* | 9/2003 | Fujita et al. ................... 709/226 |
| 2009/0222582 A1* | 9/2009 | Josefsberg et al. ........... 709/245 |

OTHER PUBLICATIONS http://tools.ietf.org/html/draft-penno-alto-cdn-03 "ALTO and Content Delivery Networks"—Mar. 2011, Penno et al, Google, Yang et al Cisco Systems.*
www.princeton.edu/~chiangm/te-cdn.pdf "Cooperative Content Distribution and Traffic Engineering in an ISP"—Princeton EDU, Jiang et al, Jun. 2009.*
Labovitz C. et al.: "Internet Inter-Domain Traffic". SIGCOMM'10, New Delhi, India. Aug. 30, 2010-Sep. 3, 2010, p. 1-12.
Wenjie J. et al.: "Cooperative Content Distribution and Traffic Engineering in an ISP Network". SIGMETRICS/Performance'09, pp. 75-86, Seattle, WA, USA. Jun. 15, 2009-Jun. 19, 2009.

(Continued)

Primary Examiner — Randy Scott
(74) Attorney, Agent, or Firm — Leydig, Voit & Mayer, Ltd.

(57) ABSTRACT

A method for enabling collaboration between an internet service provider (ISP) and another entity includes: gathering a domain name system (DNS) query; evaluating the DNS query wherein the evaluating comprises collecting candidate hosts suitable for delivering content in accordance with the DNS query; ranking the candidate hosts collected by the ISP; providing a first list of the ISP-ranked candidate hosts; forwarding the DNS query to the another entity; evaluating the DNS query wherein the evaluating comprises collecting candidate hosts suitable for delivering content in accordance with the DNS query; ranking the candidate hosts collected by the another entity; providing a second list of the another entity-ranked candidate hosts; matching the first list and the second list; and providing a matched list of ranked candidate hosts. The another entity is a content distribution system (CDN) or another ISP.

12 Claims, 5 Drawing Sheets

(56) References Cited

OTHER PUBLICATIONS

DiPalantino D. et al.: "Traffic Engineering vs. Content Distribution: A Game Theoretic Perspective". Department of Management Science and Engineering, Stanford University. 2009, p. 1-9.

Penno R. et al.: "ALTO and Content Delivery Networks—draft-penno-alto-cdn-02". Cisco Systems. Oct. 25, 2010, p. 1-22.

Contavalli C. et al.: "Client IP information in DNS requests—draft-vandergaast-edns-client-ip-01". Internet-Draft. May 2010, p. 1-24.

Poese I. et al.: "Improving Content Delivery Using Provider-aided Distance Information". IMC'10, Melbourne, Australia. Nov. 2010, p. 1-13.

Mockapetriset P.: "Domain Names—Concepts and Facilities". Request for Comments 1034, Network Working Group. Nov. 1987, p. 1-56.

Rekhter Y. et al.: "A Border Gateway Protocol 4". Request for Comments 4271, Network Working Group. Jan. 2006, p. 1-105.

Griffin T. et al.: "An Analysis of BGP Convergence Properties". SIGCOMM '99 Aug. 1999 Cambridge MA, USA. 1999, p. 277-288.

Claise B.: "Cisco Systems NetFlow Services Export Version 9". Cisco Systems. Oct. 2004, p. 1-35.

\* cited by examiner

COLLABORATION BETWEEN INTERNET SERVICE PROVIDERS AND CONTENT DISTRIBUTION SYSTEMS

CROSS-REFERENCE TO RELATED APPLICATIONS

This application claims priority to European Patent Application No. 11 15 7047.9, filed Mar. 4, 2011, which is hereby incorporated by reference herein in its entirety.

FIELD

The present invention relates to a method of enabling collaboration between an internet service provider (ISP) and a content distribution system (CDN) or between an ISP and another ISP. The present invention further relates to a computer program for implementing such a method.

BACKGROUND

In recent years, CDNs have become increasingly relevant, particularly in the field of the internet. Typically, CDNs directly peer with a large number of ISP and are responsible for a large portion of the internet and the inter-domain traffic. This situation is described and summarized, for example, in Labovitz C. et al.: "Internet Inter-Domain Traffic". SIGCOMM'10, New Delhi, India. Aug. 30, 2010-Sep. 3, 2010. CDNs may have different and conflicting objectives compared to those of ISPs. The way a CDN selects hosts to deliver content to clients is usually based on a combination of performance and cost metrics. Moreover, the ISP is typically not involved in the host selection process. This can lead to a lose-lose situation as the clients' experience may not be satisfactory and the ISP loses the control of the traffic that flows within its network. For example, the decision of a CDN is based on internet protocol (IP) addresses of a domain name system (DNS) resolver that forwards a request to the CDN and not on the IP of the client. The IP addresses and thus the location of the client or end-user are not known to the CDN in conventional implementations.

In order to improve this situation to reach a win-win situation, theoretic concepts of collaboration between ISP and CDN have been introduced. For example, game-theoretic studies such as described in Wenjie J. et al.: "Cooperative Content Distribution and Traffic Engineering in an ISP Network". SIGMETRICS/Performance'09, pp. 75-86, Seattle, Wash., USA. Jun. 15, 2009-Jun. 19, 2009, and in DiPalantino D. et al.: "Traffic Engineering vs. Content Distribution: A Game Theoretic Perspective". Department of Management Science and Engineering, Stanford University. 2009, have investigated the principle possibilities of cooperation between ISP and CDN as well as the potential of an ISP deploying its own CDN. However, even though such collaboration is discussed in theory, these studies do not propose a system that enables such collaboration, which involves complex technical hurdles in realization.

In Penno R. et al.: "ALTO and Content Delivery Networks—draft-penno-alto-cdn-02". Cisco Systems. Oct. 25, 2010, a collaborative scheme is mentioned which requires the ISP to unveil information about its operational and topological information. However, this type of information is generally too critical for most ISP to unveil. In Contavalli C. et al.: "Client IP information in DNS requests—draft-vandergaast-edns-client-ip-01". Internet-Draft. May 2010, the authors suggest forwarding the IP address of the client along with the DNS request. This involves substantial changes in the currently deployed DNS system and does not provide accurate information about the location of the end-user or client as well as about the network characteristics within the ISP.

Therefore, there is a need for allowing plural ISP and/or an ISP and a CDN to efficiently collaborate wherein sharing of critical information is prevented.

SUMMARY

In an embodiment, the present invention provides a method for enabling collaboration between an internet service provider (ISP) and another entity. The method includes the steps of: gathering a domain name system (DNS) query; evaluating, by the ISP, the DNS query wherein the evaluating comprises collecting candidate hosts suitable for delivering content in accordance with the DNS query; ranking, by the ISP, the candidate hosts collected by the ISP; providing, by the ISP, a first list of the ISP-ranked candidate hosts; forwarding, by the ISP, the DNS query to the another entity; evaluating, by the another entity, the DNS query wherein the evaluating comprises collecting candidate hosts suitable for delivering content in accordance with the DNS query; ranking, by the another entity, the candidate hosts collected by the another entity; providing, by the another entity, a second list of the another entity-ranked candidate hosts; matching the first list and the second list; and providing a matched list of ranked candidate hosts. The another entity is a content distribution system (CDN) or another ISP.

DETAILED DESCRIPTION

Figure 1:
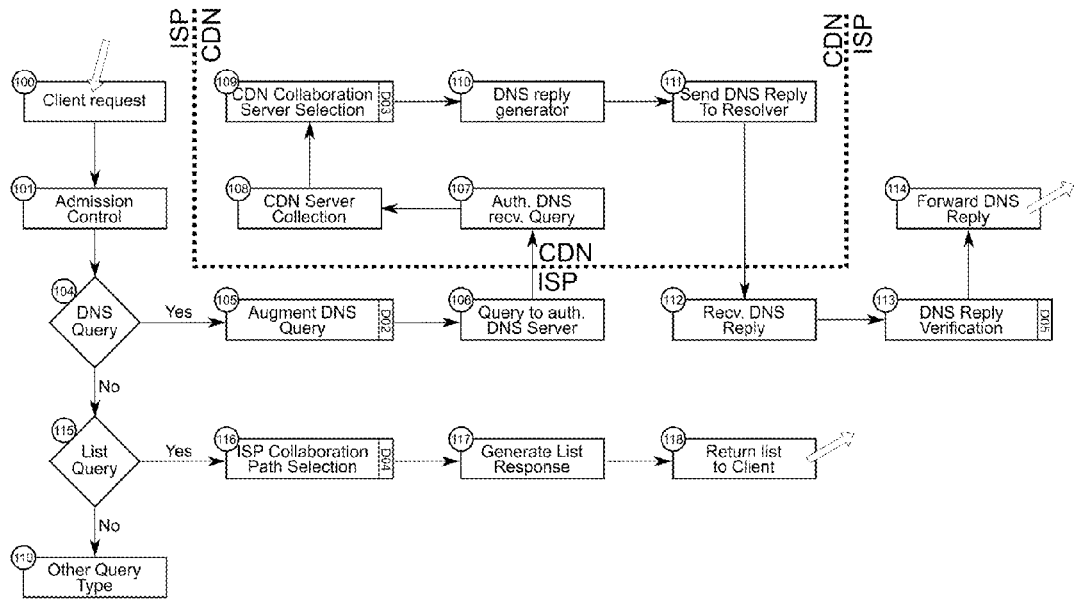
FIG. 1, henceforth also referred to as diagram D01, shows the general architecture of an embodiment.

In an embodiment, the present invention provides a method of enabling collaboration between an ISP and a CDN or between the ISP and another ISP. The method includes: gathering a DNS query; the ISP evaluating the DNS query, wherein candidate hosts suitable for delivering content in accordance with the DNS query are collected; the ISP ranking the candidate hosts; the ISP providing a first list of the ISP-ranked candidate hosts; the ISP forwarding the DNS query to the CDN or to the other ISP; the CDN or the other ISP evaluating the DNS query wherein candidate hosts suitable for delivering content in accordance with the DNS query are collected; the CDN or the other ISP ranking the candidate hosts; the CDN or the other ISP providing a second list of the CDN-ranked or other ISP-ranked candidate hosts; matching the first list and the second list; and providing a matched list of ranked candidate hosts. In particular, the method can be a computer implemented method.

An ISP in this context can relate to an organization or system that offers and organizes access to the internet, particularly to the World Wide Web, for clients. A client in the context of the invention can relate to an end-user, an application running on the user side, an operating system process, a network card process or the like, as well as from a home router, a DNS resolver, and a content provider. It can also relate to an aggregated DNS submission reply system that maps domain requests to cluster of hosts, for example, as described in Poese I. et al.: "Improving Content Delivery Using Provider-aided Distance Information". IMC'10, Melbourne, Australia. November 2010, and in Mockapetriset P.: "DOMAIN NAMES-CONCEPTS AND FACILITIES". Request for Comments 1034, Network Working Group. November 1987. A CDN in this context can relate to a system of computers comprising copies of data placed at various points in a network such as the internet so as to maximize bandwidth for access to the data from clients throughout the network. Thus, a CDN can be a system of caches, places or hosts at various points in the internet so as to maximize the bandwidth for access to the data as well as minimizing the network distance to the client. Candidate hosts in this context can relate to any eligible hosts or servers which are arranged to deliver the content requested via the DNS query. A DNS can relate to a hierarchical naming system built on a distributed database for devices such as computers, services, or any resource connected to a network as the internet which translates domain names into the numerical identifiers such as IP addresses associated with networking equipment for the purpose of locating and addressing these devices. In this context, an IP can relate to a primary protocol that establishes the internet. A CDN may be deployed within an ISP or they can peer with them. In particular, for the collaboration between two or more ISPs, one of them can be connected to a CDN or run a CDN.

The CDN or the other ISP referenced above can be a plurality of CDNs or a plurality of other ISPs, respectively. Gathering the DNS query can be performed by the ISP wherein the DNS query can be a DNS query from a client. The ISP ranking the candidate hosts can be performed in accordance with a network of the ISP and/or in accordance with an ISP ranking function. The CDN ranking of the candidate hosts can be performed in accordance with hosts' information and/or in accordance with a CDN ranking function. The other ISP ranking of the candidate hosts can be performed in accordance with a network of the other ISP and/or in accordance with an ISP ranking function. Matching the first list and the second list can be performed by the ISP and particularly a collaboration service thereof. Providing the matched list of the matched candidate hosts can be performed by the ISP to the client.

The method according to an embodiment of the invention provides for enabling ISP-CDN collaboration that can be transparent to the client and at the same time not unveiling critical information about the ISP topology and operation as well as the host decision process and deployment of the CDN. Thus, this can result in a win-win situation of both parties, i.e., the ISP and the CDN as well as the client. Furthermore, the method according to the invention also provides for enabling collaboration among multiple ISPs. Conventionally, ISPs usually exchange information towards collaboration only via the border gate protocol (BGP). However, the BGP was originally introduced primarily for connectivity and not for collaboration and it is generally unaware of the topological information and network operation within an involved ISP. Also, it faces convergence problems and may not react quickly, for example, as described in Rekhter Y. et al.: "A Border Gateway Protocol 4". Request for Comments 4271, Network Working Group. January 2006, or in Griffin T. et al.: "An Analysis of BGP Convergence Properties". SIGCOMM '99 8/99 Cambridge Mass., USA. 1999.

According to an embodiment, by providing the first list of the ISP-ranked candidate hosts as well as the second list of the CDN-ranked or other ISP-ranked candidate hosts, and by matching these two lists, a client can obtain the matched list of matched candidate hosts. Thus, it is possible that the ISP efficiently collaborates with the CDN or the other ISP without transferring or unveiling critical information between each other.

In an embodiment, the first list and the second list are matched based on a predefined merging function, pursuant to which matching of the two lists can efficiently be performed. In a further embodiment, matching can conveniently be adapted to the preferences of the ISP and/or the CDN or other ISP.

In an embodiment, the method includes the steps of: the ISP augmenting the DNS query with an IP address of a collaboration service prior forwarding the DNS query to the CDN; and the CDN providing the second list of the CDN-ranked candidate hosts to the collaboration service of the ISP using the IP address of the collaboration service. Thereby, the collaboration service can be a collaboration service of the ISP. Providing the CDN-list of the CDN-ranked candidate hosts to the collaboration service of the ISP using the IP address of the collaboration service of the ISP can be performed by the CDN. Such a method allows for an efficient communication and particularly an efficient list exchange between the ISP and the CDN.

In an embodiment, the ISP forwards the DNS query to an authorized DNS server of the CDN. A DNS server in this context can relate to any service or server computer performing domain name system functionalities within the CDN. The method includes the step of establishing a communication channel between the ISP and the CDN. Such a communication channel can allow for an efficient information exchange between the ISP and CDN particularly to exchange the first and second lists as well as the DNS query.

In an embodiment, the ISP forwards the first list together with the DNS query to the CDN. The CDN can consider the first list when evaluating the DNS query and collecting the candidate hosts. The method includes the step of logging communication steps and results associated thereto. Thus, communication between the ISP and the CDN can be reproducible and can be monitored.

In an embodiment, the method further includes the steps of: mapping the candidate hosts of the first list to ingress points of the ISP; identifying the other ISP being a neighboring ISP; and establishing communication paths between the ISP and the other ISP. Neighboring ISPs can particularly relate to one-hop ISPs wherein a hop in this context is a network topology distance and a length that may not be specified topographically, i.e., one hop is the step from one router or node to the next on the path of a packet in the network. Mapping of the candidate hosts to the ingress points can be based network and/or netflow information. In this context, the method utilizes information about the ingress point of traffic and identifies the one-hop neighboring ISP that are involved using netflow information, for example, as described in Claise B.: "Cisco Systems NetFlow Services Export Version 9". Cisco Systems. October 2004. It establishes a communication channel among the involved ISPs and in cooperative fashion matches the list of ingress/egress points that content has to be routed before being delivered to the client. Thereby, the method further includes the step of mapping the ingress points of the ISP to egress points of the other ISP.

In an embodiment, the method further includes the step of splitting the first list of candidate hosts by the neighboring other ISP. Thereby, the method includes the steps of: the other ISP ranking the candidate hosts of the split first lists; and the other ISP providing the second lists of other ISP-ranked candidate hosts.

Thus, system which in mode of service gathers DNS queries being augmented with an address of the ISP's collaboration service is provided. The system forwards the augmented DNS queries to the CDN's DNS server which in turn can proceed with its normal operation, i.e., namely selecting caches or hosts, with the exception that it sends the list of candidate hosts or candidate caches to the collaboration service of the ISP ordered by preference. When the ISP or its collaboration service receives back a ranked preference list from the CDN with eligible hosts or servers to deliver content to client hosts, it ranks them according to the ranking function by the ISP and sends the ISP preference list back to the CDN or client. Thereby, for example, there can be two distinct modes of operation depending on the type of query. It can be checked for a DNS query wherein, in this case, the client can either be an end system (e.g., a customer, a single computer, etc.) or another DNS server asking for a hostname to be resolved. However, if a list query is received, the client in this case can be the CDN itself. This can be a recursive call, enabling the invention to be deployed in multiple different network and thus being able to ask other instances of itself for a more fine-grained ranking.

In a further embodiment, a system which in mode of service repeats the above described procedure for enabling collaboration among multiple ISPs is provided. Thereby, when the system receives the list of candidate hosts, it maps them to the ingress points of the ISPs and establishes communication paths with the one-hop neighboring ISPs that are involved. It then splits the aforementioned list of candidate hosts by the neighboring ISPs and maps exchanged points, i.e., ingress points of one ISP and egress point of the other ISP, and performs collaborative ranking. An ISP resolver that is used by the client can merge the two lists based on a predefined ranking function and returns the merged list back to the client that initiated the request. This system may enable cooperative ranking that involves one or more CDNs and one or more ISPs. In a mode of service, the system may also be used by the DNS reply aggregator to enable ISP-ISP collaboration without involving a CDN.

In another further embodiment, a computer program having code arranged to implement a method as described above when being executed is provided. With such a computer program, a previously described method as well as its effects and benefits can efficiently and conveniently be implemented and distributed.

These and other aspects of the invention will be apparent from and elucidated with reference to the exemplary embodiments described hereinafter.

FIG. 1 or diagram D01 shows the general architecture of the method or system according to an embodiment of the invention. There are two main components: one in the CDN part and one in the ISP part. It is to note that there are two modes, one that deals with the process of DNS queries and another one that deals with the process of list queries that may be an outcome of the augmentation of initially submitted DNS queries that return a list of candidate hosts by the CDN, or a directly submitted query of the list of hosts that is submitted to a one-hop neighboring ISP.

The client of the system (100) can be an end-user, applications running on the user-side, operating system processes, or network card processes, as well as from home routers, DNS resolvers, and content providers. It can also be an aggregated DNS submission-reply system that maps domain requests to cluster of hosts. Before any submitted request is forwarded to other components of the system, an admission control subsystem has to approve the validity of the request based on the IP of the client, identity, and format of request (101). The system supports two types of requests: one in the format of a DNS query and one in the format of a list query. Once a request is admitted, there is a checker for the format of the request. The first checker (104) indicates if the request is a DNS query. If it is not a DNS query a second checker (115) indicates if the request is a list query. If the submitted query is neither DNS nor list query then an error message (119) is returned back to the client and an entry is added in a log file with the client identity and the type of error.

If any query is a DNS query then the DNS query is augmented (105) as will be described in detail with regard to FIG. 2 below. Once the DNS query has been augmented, it is sent to an authoritative CDN DNS server (106). Within the CDN the authoritative DNS server is receiving the request (107) and compiles a selection of CDN servers/hosts (108) capable of satisfying this request. The list then is sent to the CDN collaboration server selection component (109) where it is first ranked by the CDN and then by the ISP. Thereby, the CDN becomes a client of the ISP in a list query (see (100)). Finally, the CDN receives the ranked preference list from the ISP and merges the two lists. This procedure is described in detail with regard to FIG. 3 below. When the merged list is received back the DNS reply is generated (110). The DNS reply is sent to the ISP DNS resolver (111) which sent it in the first place (at 106). The DNS reply is received by the resolver (112), and it is verified for validity (113). The verification procedure is described in detail with regard to FIG. 5 below. Once the reply has been verified, the DNS reply is finally forwarded to the client (114).

If the query (received in 100) is a list query (115) then the query is forwarded to the ISP-collaboration component (116). This component is described in detail with regard to FIG. 4 below. Once the collaboration with the ISP is performed, the list response is compiled (117) and the return list is sent to the client (118).

Figure 2:
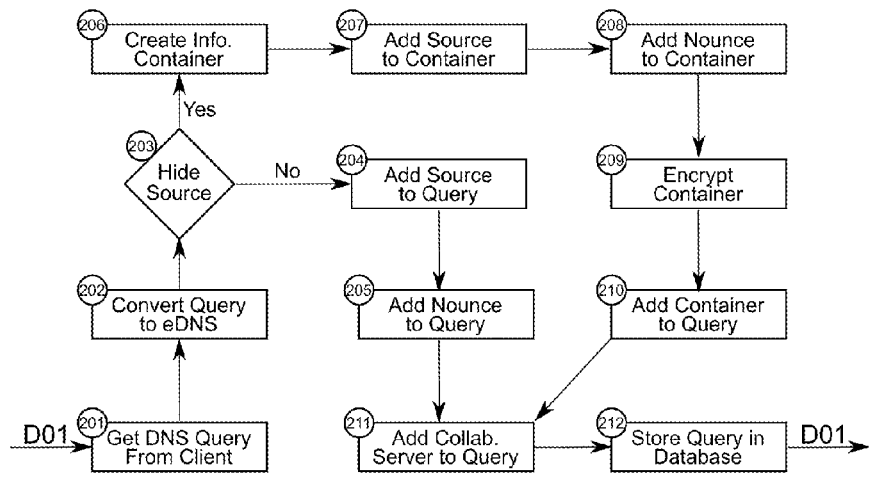
FIG. 2, henceforth also referred to as diagram D02, shows a flow scheme of selection methods to perform the DNS query authorization in the case that the ISP DNS resolver is establishing a secure channel with the ISP recommendation systems in an embodiment.

FIG. 2 or diagram D02 shows the flow of selection methods to perform the DNS query authorization in the case that the ISP DNS resolver is establishing a secure channel with a ISP recommendation systems, which can be called provider-aided distance information system (PaDIS), for example, as described in Poese I. et al.: "Improving Content Delivery Using Provider-aided Distance Information". IMC'10, Melbourne, Australia. November 2010, in order to preserve the anonymity of the client as well as preventing unveiling information on the selection ranking function used by the ISP.

Once a valid DNS query is received from a client (201) it is converted to an eDNS query (202) to be augmented with additional information. It is checked if the source should be hidden (203). If so, an information container is created (206), the source of the query is added to the container (207), a nounce is added to the container (208), the container is encrypted (209), the container is added to the query (209), the collaborative server is added to the query (211), and the query is stored in the database (212), and then the DNS query is forwarded to the authoritative DNS server (see D01-106). Nounce in this context relates to a randomly chosen value different from previous choices intended to protect against replay. If the source should not be hidden, the source is added to the query (204) in plain text, the nounce is added to the query (205) in plain text, the collaborative server is added in the query (211) and the query is stored in the database (212) and then the DNS query is forwarded to the authoritative DNS server (see D01-106). The collaboration server is added to the query as it will be the one that is in charge to collaborate with one of the collaborative servers of the other party (ISP or CDN).

Figure 3:
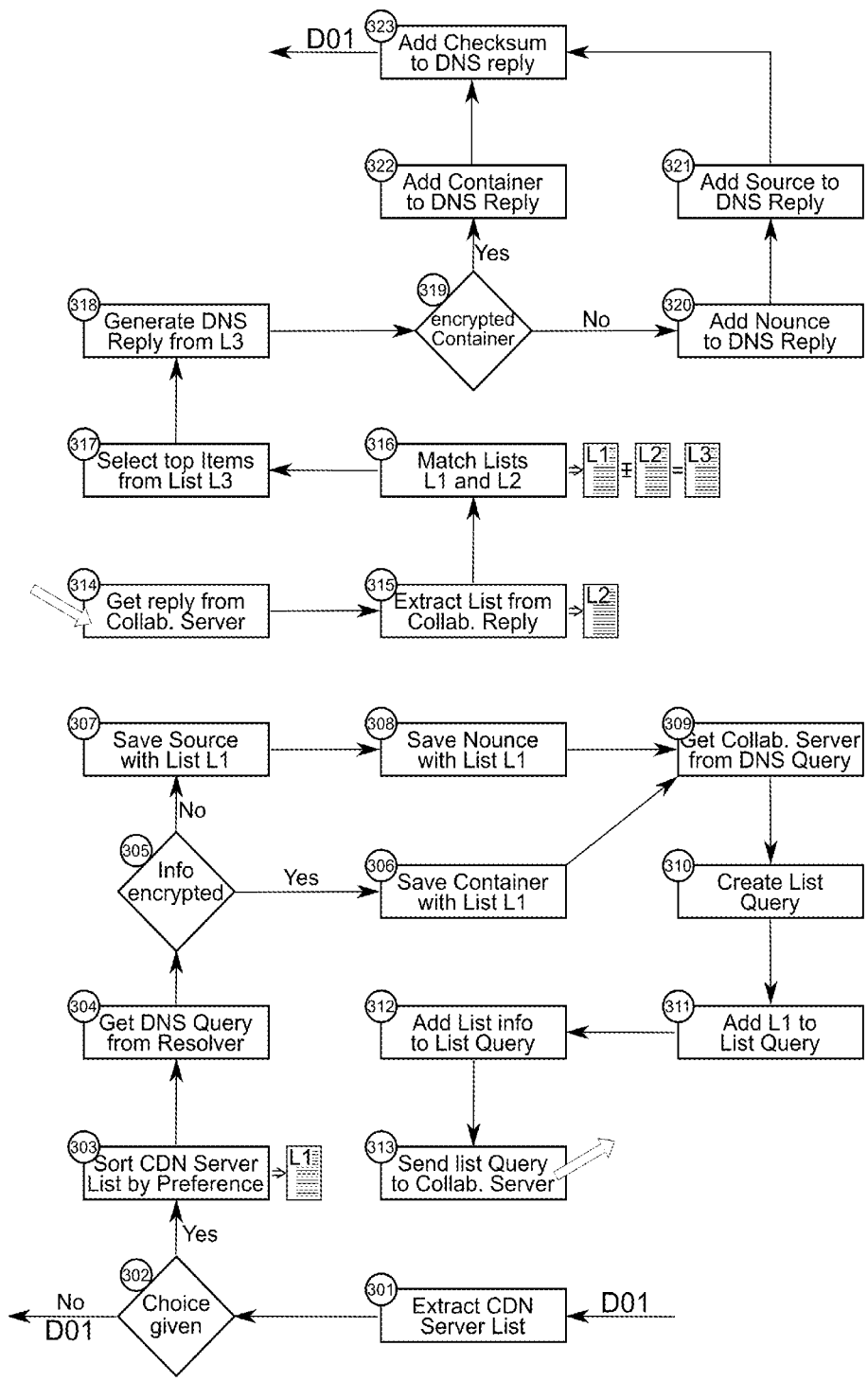
FIG. 3, henceforth also referred to as diagram D03, shows a flow scheme of selections in the ISP-CDN collaboration component which is handling the case of being inside a CDN in an embodiment.

FIG. 3 or diagram D03 shows the flow of selections in the ISP-CDN collaboration component which is handling the case of being inside a CDN. The diagram describes how the list of candidate hosts is provided by the CDN and how the ranked version of the same list, based on the view of the CDN, is merged and sent to the ISP collaboration server before being handed back to the ISP DNS resolver.

In particular FIG. 3 shows the flow of selection in the selections in the ISP-CDN collaboration component which is run by the party doing the server selection. This partner is usually a CDN—but it is not limited to CDN. Once a query is received by the CDN, a list of candidate servers/hosts is extracted from the mapping performed by the CDN (301). Then it is checked if there are multiple host eligible to deliver the requested content (302). If no, then this information is returned back to the ISP resolver. If a list with at least two distinctive entries is generated, henceforth called L1, then the list of servers/hosts is ranked based on the CDN ranking function and preference (303). Then the DNS query from the resolver is retrieved (304).

There is a check if the information should be encrypted (305). If the information has to be encrypted then a container with list L1 is saved (306) and the collaborative server from DNS query is also retrieved (309). If the information is not encrypted then the source is saved with the list L1 (307), the nounce with the list L1 is also saved (308), and the collaborative server from the DNS query is also retrieved (309). No matter if the information is encrypted or not, a list query is generated (310) and the list L1 is added in the query (311). Then the additional list information (from 306, 307 or 308) is added to the list Query (312) and it is sent to the collaboration server (313) as specified with the list L1. This List is received in D01-100 as a list request.

Once the reply from the collaboration server is received (314), the list, henceforth called L2, from the collaborative reply is extracted (315). The two lists L1 and L2 are matched based on a predefined matching algorithm (316) and a new list, henceforth called L3 is generated (316). All three lists are saved to a database. Then, the top-k items of the list are selected where k is an input to the system (317) specifying the number of servers returned to the client asking for DNS resolution. Then a reply that contains the top-k entries of L3 is generated (318). It is then checked if the reply incorporates an encrypted container (319). If so, a container is added in the DNS reply (322), a checksum is added to the DNS reply (323) and the DNS reply is forwarded to the DNS reply generator (see D01-110). If the reply does not contain an encrypted container, the nounce is added in the DNS reply (320), the source is added to the DNS reply (321), a checksum is added to the DNS reply (323) and the DNS reply is forwarded to the DNS reply generator (see D01-110).

Figure 4:
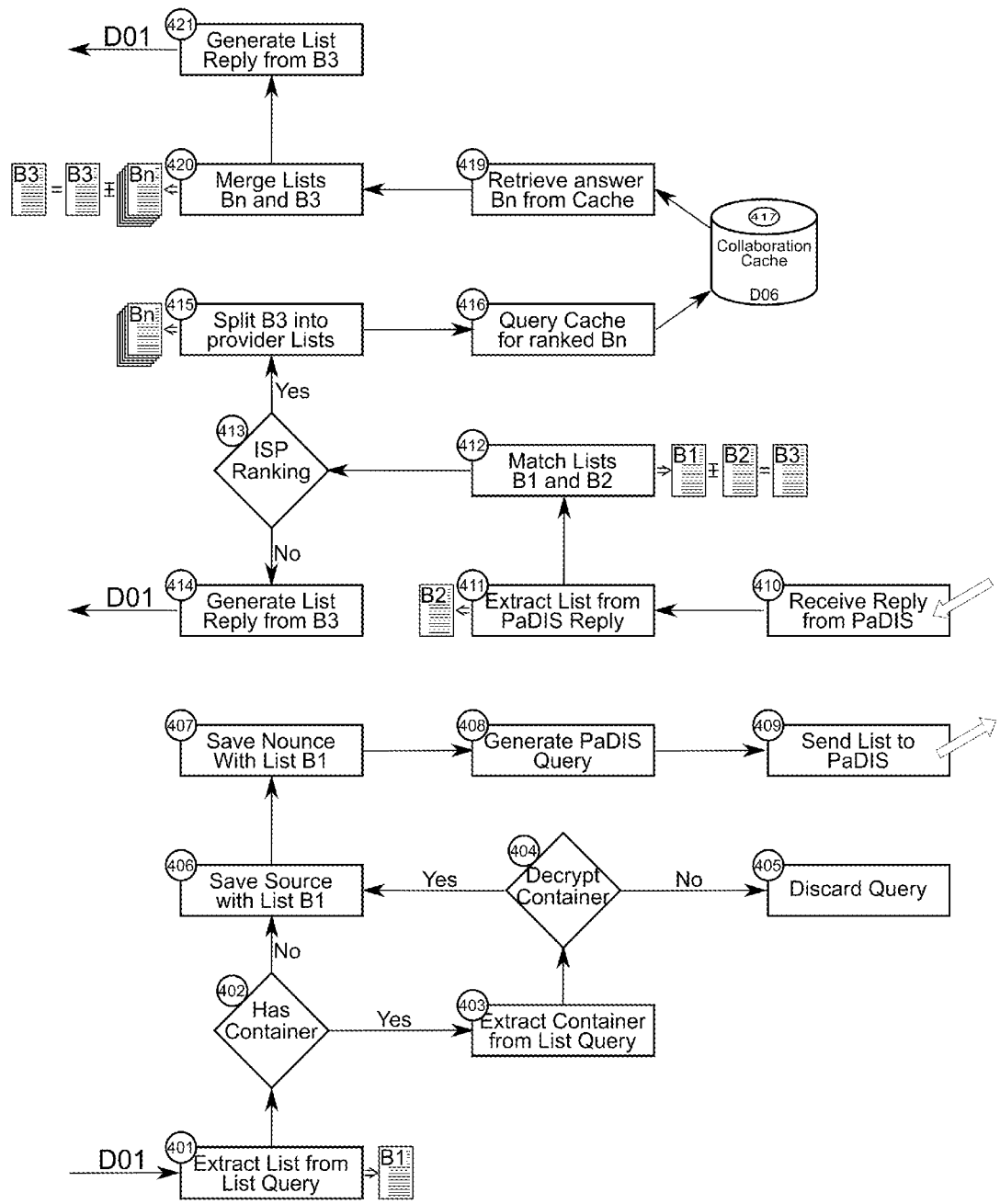
FIG. 4, henceforth also referred to as diagram D04, shows a flow scheme of selections in the ISP collaboration component which is handling the case if being inside an ISP in an embodiment.

FIG. 4 or diagram D04 shows the flow of selections in the ISP collaboration component which is handling the case if being inside an ISP. Once a list of ranked candidate hosts is received, this is forwarded to the ranking system of the ISP such as PaDIS, which re-ranks the list. In the case that more than one ISP is involved, the initial ranked list has to be split to n sub-lists, where n is the number of one-hop neighboring ISP that are involved.

In particular, FIG. 4 shows the flow of selection selections in the ISP collaboration component. Once a list query is received, the list, henceforth called B1, is extracted from the list query (401). It is then checked if this has a container (402). If so, the container is extracted from the list query (403). If the container can not be decrypted (404) then the query is discarded and an entry with the error and other information related to the query is saved in the log (405). If the container can be decrypted (404) then the source is saved with the list B1 (406). If the list query has no container (402) then again the source is saved with the list B1 (406).

Then the nounce is saved with the list B1 (407), a PaDIS query is generated (408), and the list is sent to PaDIS for ranking (409). When the reply from PaDIS is received (410), the list, henceforth called B2, from the PaDIS reply is extracted (411), and then the two lists B1 and B2 are matched based on a predefined matching function to a new list, henceforth called B3 (412). The Lists B1, B2 and B3 are saved in a database for later verification through a DNS reply verification component. It is then checked if an ISP ranking is required (413). If ISP collaboration is not enabled (413), a list reply is generated from B3 (414) and is send back to the client which requested the list ranking (see D01-117).

If ISP collaboration is enabled (413), the list B3 is split into sublists, each containing all entries associated with one neighboring ISP (415). Each list is requested from the cache or host (416). The cache handles the requests (417) and returns the answers to the ranking requests based on its knowledge. This is described in detail with regard to FIG. 6 below. Once the cache entries have been retrieved (419), the ranked lists Bn are merged via a predefined matching function with the current list B3 (420), overwriting B3 itself with the result. Once the new B3 has been generated (421), a list reply is generated from the new list B3 and it is send back to the client which requested the list ranking (see D01-117).

Figure 5:
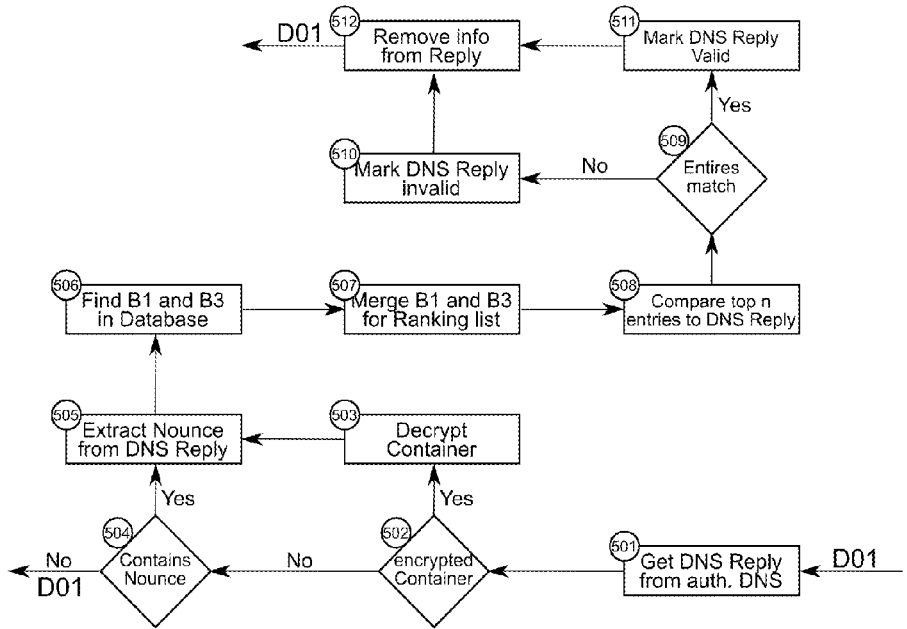
FIG. 5, henceforth also referred to as diagram D05, shows the flow of selections in the ISP verification component in an embodiment.

FIG. 5 or diagram D05 shows the flow of selections in the ISP Verification component that is used to verify that the returned selected servers are valid before returning them back to the client via DNS.

In particular, FIG. 5 shows the flow of selections in the ISP Verification component that is used to verify that the returned merged list is valid before forwarded it back to the client. Once a DNS reply from the authoritative DNS server is received (501), it is checked if the container is encrypted (502). If so, the container is decrypted (503). Then, the nounce is extracted from DNS reply (505). If it is not decrypted, it is checked if it contains the nounce (504). If it does not contain the nounce then the reply is marked as not augmented and returned to the DNS client. If it contains the nounce then the nounce is extracted from the DNS reply (505). Then, lists B1 and B3 are retrieved from the database (506), and the lists B1 and B3 are merged in the same way as the CDN merged lists L1 and L2 (see D03-316) in order to generate the final ranking list (507) seen by both parties. The top n entries are compared in the DNS reply (508) and the entries match is checked (509). If the match is valid then the DNS reply is marked as valid (511). If the entries do not match, then the DNS reply is marked as invalid (510). In both cases the additional information added for ranking is removed from the reply (512) and the DNS reply is forwarded to the client.

Figure 6:
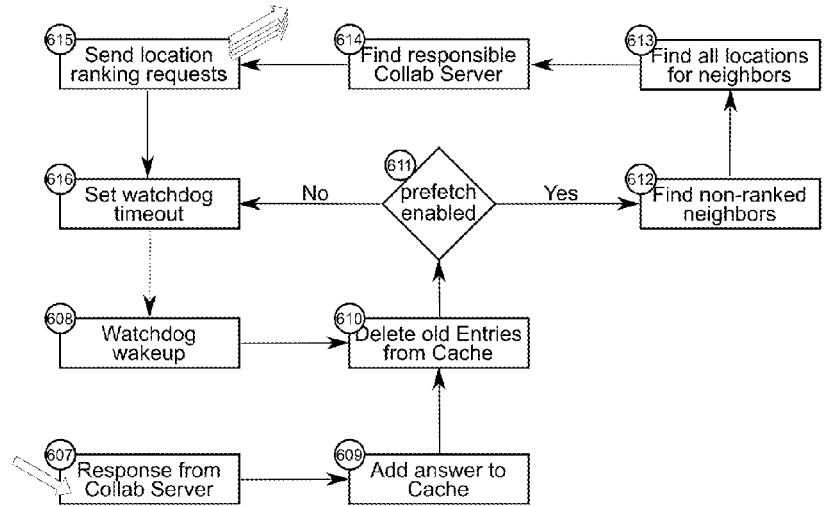
FIG. 6, henceforth also referred to as diagram D06, shows the caching procedure for ISP collaboration caching in an embodiment.
Figure 6:
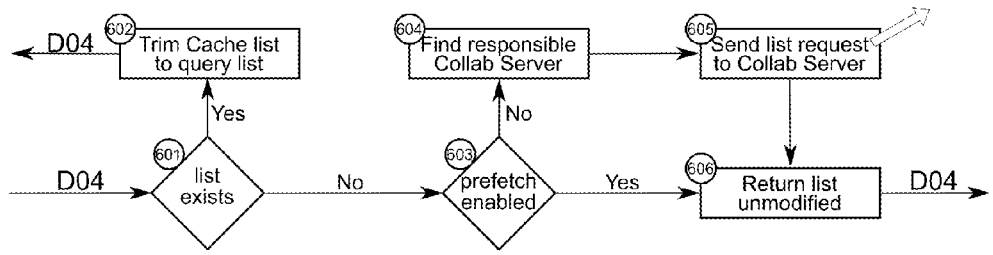

FIG. 6 or diagram D06 shows the caching strategy for ISP collaboration caching. It decides if the caching is done preemptive or on demand only. Also the cache cleaning and querying of ISP is handled in the case of multiple ISP being involved in the ranking.

In particular, FIG. 6 shows two possible ways of handling a cache of pre-ranked replies from neighboring ISP in order to speed up ranking. The cache is split into two parts—the request (see lower section of FIG. 6) and the management part (see upper section of FIG. 6). When a list is requested to be ranked, the cache is asked to provide the answer to it (see D04-417). The first thing the cache checks is if the answer, or a superset of it, is locally available, i.e. if it is in the cache (601). If this is the case, the cached list is fetched from the database, all entries that are not needed for this ranking are removed (602), and the list is handed back as being ranked by neighboring ISP (see D04-419).

In the case of the list or a superset not being in the cache, it first has to be decided how the caching is being handled (603). In the case of pre-fetch querying not being enabled, it means that the neighboring ISP has not been asked to provide a ranking. For the ranking, the appropriate ranking servers have to be found (604) and the ranking requests are being send to the servers (605). However, there is no active waiting for an answer, due to the fact that the ranking is time critical. The list is returned immediately unmodified from the cache (606). In the case of pre-fetching being enabled (603), the system can be sure that there is no neighboring ISP who can rank the request—if there was, the cache would contain this entry. In this case, no action is taken and the list is returned unmodified from the cache (606).

When an answer to a ranking request is received from a neighboring ISP (607) it is immediately added to the cache (609). Then the cache is checked for any stale entries that have expired their time to live (610). The next step is to decide if pre-fetching is enabled (611). If it is not enabled, a watchdog is set in place to wake up after a timer has expired (616). Once the watchdog wakes up (608) it rechecks the cache for stale entries (610).

If pre-fetching of lists is enabled (611), all neighboring ISP that are currently not in the cache are gathered (612). Once the ISP are known, all locations inside these ISP are formed into list requests (613). This results in one list request per neighboring ISP. Each list is paired with a collaboration server from the neighboring ISP it belongs to (614). Lastly, the lists are sent off as requests to be ranked (615) by the neighboring ISP. Once they have left, a watchdog is set in place to wake up after a time has expired (616). When the watchdog wakes up (608) it restarts the loop of checking and filling the cache.

Figure 7:
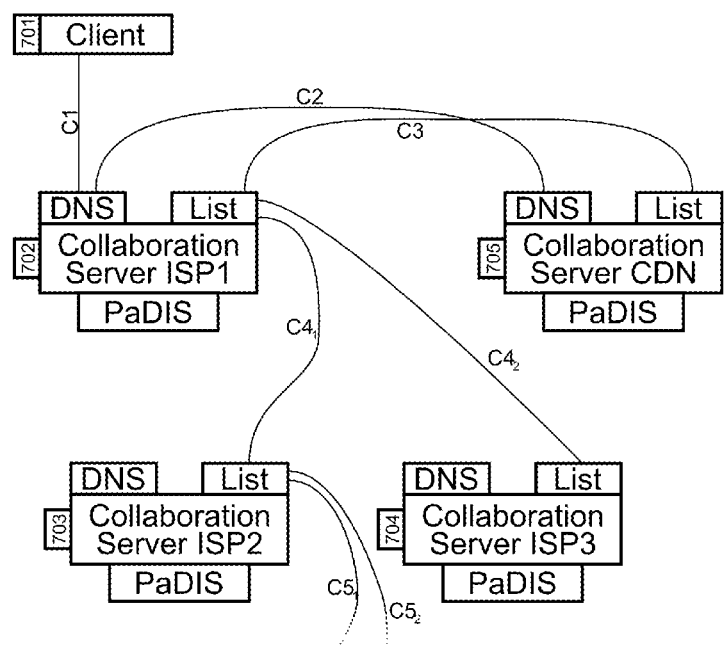
FIG. 7, henceforth also referred to as diagram D07, shows the collaboration of an ISP (ISP1) with two other ISP (ISP2 and ISP3) and a CDN in an embodiment.

FIG. 7 or diagram D07 shows a possible deployment of the proposed system that enables the collaboration of an ISP (ISP1) with two other ISP (ISP2 and ISP3) and a CDN. It is easy to generalize this deployment involving an arbitrary number of ISP and CDN. PaDIS is used purely for ranking hosts in a list based on the unique ranked function that is used in every different entity that can be an ISP or a CDN.

In particular, FIG. 7 shows a possible deployment of a number of presented above collaborative systems that involve three ISP and a CDN. The above presented collaborative system can be co-located with the DNS resolver and a recommendation system such as PaDIS. The system can act as a collaborative system on the ISP or the CDN site. A main task of the system is to exchange and merge ranked lists. This diagram shows how ISP1 (702) can take advantage of the above presented system in order to collaborate with the CDN (705) as well as with ISP2 (703) and ISP3 (704) by splitting the lists to sublists, exchange the sublists and then merge the ranked sublists as described above. There might be arbitrary instances of the presented system as shown in the diagram as ISP2 can also collaborate with other ISP. In FIG. 7, the communications that are established between the different entities in the presented deployment are also shown. Namely, C1 is the communication channel between client and the DNS resolver of ISP1, C2 is communication channel that takes place while a DNS request by a client is augmented and the request is forwarded to the authoritative DNS server of the CDN. C3 is the communication channel established for the exchange of the ranked lists between ISP1 and the CDN. C4-1 and C4-2 are the communication channels established to exchange the rankings of the sublists between ISP1 and ISP2, and ISP1 and ISP3 respectively. C5-1 and C5-2 are communications channels established to exchange the sublists between ISP2 and other one-hop neighboring ISP of ISP2. The deployment of the system is fully transparent to the client.

As shown in FIG. 7, C5$x$ head to potentially more cascaded systems. As the list is split and sent to neighboring systems it grows shorter until it is finally reduced to one or reaches its end point. Since the number of steps is undefined, C5$x$ show that it can potentially go on but must not mandatorily do so if the ISP-ISP collaboration ends at 703.

While the invention has been illustrated and described in detail in the drawings and foregoing description, such illustration and description are to be considered illustrative or exemplary and not restrictive. It will be understood that changes and modifications may be made by those of ordinary skill within the scope and spirit of the following claims. In particular, the present invention covers further embodiments with any combination of features from different embodiments described above and below.

The invention also covers all further features shown in the Figs. individually although they may not have been described in the afore or following description. Also, single alternatives of the embodiments described in the figures and the description and single alternatives of features thereof can be disclaimed from the subject matter of the invention.

Furthermore, in the claims the word "comprising" does not exclude other elements or steps, and the indefinite article "a" or "an" does not exclude a plurality. A single unit may fulfill the functions of several features recited in the claims. The terms "essentially", "about", "approximately" and the like in connection with an attribute or a value particularly also define exactly the attribute or exactly the value, respectively. A computer program may be stored/distributed on a suitable medium, such as an optical storage medium or a solid-state medium supplied together with or as part of other hardware, but may also be distributed in other forms, such as via the internet or other wired or wireless telecommunication systems. In particular, e.g., a computer program can be a computer program product stored on a computer readable medium which computer program product can have computer executable program code adapted to be executed to implement a specific method such as the method according to the invention. Any reference signs in the claims should not be construed as limiting the scope.

The invention claimed is:

1. A method for enabling collaboration between an internet service provider (ISP) and another entity, the method comprising the steps of:
 gathering a domain name system (DNS) query;
 evaluating, by the ISP, the DNS query wherein the evaluating comprises collecting candidate hosts suitable for delivering content in accordance with the DNS query;

ranking, by the ISP, the candidate hosts collected by the ISP;

providing, by the ISP, a first list of the ISP-ranked candidate hosts;

forwarding, by the ISP, the DNS query to the another entity;

evaluating, by the another entity, the DNS query wherein the evaluating comprises collecting candidate hosts suitable for delivering content in accordance with the DNS query;

ranking, by the another entity, the candidate hosts collected by the another entity;

providing, by the another entity, a second list of the another entity-ranked candidate hosts;

matching the first list and the second list; and providing a matched list of ranked candidate hosts;

wherein the another entity is a content distribution system (CDN) or another ISP.

2. The method according to claim 1, wherein the first list and the second list are matched based on a predefined merging function.

3. The method according to claim 1, wherein the another entity is the CDN and the method comprises the steps of:

augmenting, by the ISP, the DNS query with an internet protocol (IP) address of a collaboration service prior to forwarding the DNS query to the CDN; and providing, by the CDN, the second list of the CDN-ranked candidate hosts to the collaboration service of the ISP using the IP address of the collaboration service.

4. The method according to claim 1, wherein the another entity is the CDN and the ISP forwards the DNS query to an authorized DNS server of the CDN.

5. The method according to claim 1, wherein the another entity is the CDN, and the method further comprises the step of:

establishing a communication channel between the ISP and the CDN.

6. The method according to claim 1, wherein the another entity is the CDN, and the ISP forwards the first list together with the DNS query to the CDN.

7. The method according to claim 1, further comprising the step of:

logging communication steps and results associated thereto.

8. The method according to claim 1, wherein the another entity is the another ISP and the method further comprises the steps of:

mapping the candidate hosts of the first list to ingress points of the ISP;

identifying the another ISP being a neighboring ISP, and establishing communication paths between the ISP and the another ISP.

9. The method according to claim 8, further comprising the step of:

mapping the ingress points of the ISP to egress points of the another ISP.

10. The method according to claim 8, further comprising the step of:

splitting the first list of candidate hosts by the another ISP.

11. The method according to claim 10, comprising the steps of:

ranking, by the another ISP, the candidate hosts of the split first lists; and providing, by the another ISP, the second list of the another ISP-ranked candidate hosts.

12. One or more tangible, non-transitory computer-readable media having thereon computer-executable instructions for enabling collaboration between an internet service provider (ISP) and another entity, the computer-executable instructions, when executed, causing one or more processors to execute the steps of:

gathering a domain name system (DNS) query;

evaluating, by the ISP, the DNS query wherein the evaluating comprises collecting candidate hosts suitable for delivering content in accordance with the DNS query;

ranking, by the ISP, the candidate hosts collected by the ISP;

providing, by the ISP, a first list of the ISP-ranked candidate hosts;

forwarding, by the ISP, the DNS query to the another entity;

evaluating, by the another entity, the DNS query wherein the evaluating comprises collecting candidate hosts suitable for delivering content in accordance with the DNS query;

ranking, by the another entity, the candidate hosts collected by the another entity;

providing, by the another entity, a second list of the another entity-ranked candidate hosts;

matching the first list and the second list; and providing a matched list of ranked candidate hosts;

wherein the another entity is a content distribution system (CDN) or another ISP.

* * * * *